(12) United States Patent
Minasyan et al.

(10) Patent No.: US 11,579,849 B2
(45) Date of Patent: Feb. 14, 2023

(54) GENERATING HIGHER-LEVEL SEMANTICS DATA FOR DEVELOPMENT OF VISUAL CONTENT

(71) Applicant: TENWEB, INC., Newark, DE (US)

(72) Inventors: Artavazd Minasyan, Yerevan (AM); Tigran Nazaryan, Yerevan (AM); Avetik Arakelyan, Yerevan (AM); Sergey Poghosyan, Yerevan (AM); Mher Veziryan, Yerevan (AM); Hayk Poghosyan, Yerevan (AM)

(73) Assignee: TENWEB, INC., Newark, DE (US)

( * ) Notice: Subject to any disclaimer, the term of this patent is extended or adjusted under 35 U.S.C. 154(b) by 89 days.

(21) Appl. No.: 17/100,831

(22) Filed: Nov. 21, 2020

(65) Prior Publication Data

US 2021/0157554 A1    May 27, 2021

Related U.S. Application Data

(60) Provisional application No. 62/938,954, filed on Nov. 22, 2019.

(51) Int. Cl.
*G06F 8/38* (2018.01)
*G06F 8/20* (2018.01)
(Continued)

(52) U.S. Cl.
CPC .......... *G06F 8/38* (2013.01); *G06F 8/24* (2013.01); *G06F 9/451* (2018.02); *G06F 16/285* (2019.01); *G06N 7/005* (2013.01); *G06N 20/00* (2019.01)

(58) Field of Classification Search
CPC ... G06F 8/24; G06F 8/38; G06F 9/451; G06F 16/285; G06N 20/00; G06N 7/005
See application file for complete search history.

(56) References Cited

U.S. PATENT DOCUMENTS 9,558,164 B1 * 1/2017 Sevrinsky ............ G06F 40/154
10,089,442 B2 * 10/2018 Van Zon ................ G16H 70/20
(Continued)

FOREIGN PATENT DOCUMENTS

CN    109325204 A    2/2019

OTHER PUBLICATIONS

Wolfgang Holzinger et al., "Using Ontologies for Extracting Product Features from Web Pages", [Online], pp. 286-299, [Retrieved from Internet on Oct. 14, 2022], <https://link.springer.com/content/pdf/10.1007/11926078_21.pdf> (Year: 2006).*

(Continued)

*Primary Examiner* — Ziaul A Chowdhury
(74) *Attorney, Agent, or Firm* — Arluys IP, P.C.

(57) ABSTRACT

Techniques are described for generating HLSD for a textual format source code, which, when rendered, causes a display of visual content. The rendering of the source code generates a tree hierarchy of visual source elements, which logically is possible to map to any graph tree. In an embodiment, visual source elements of the source code are classified to higher-level semantic data (HLSD) labels based on their property(s) and/or the property(s) of neighbor visual source element(s) in the tree hierarchy (context). The HLSD labels indicate the type of HLSD widget mapped to the visual source elements. Techniques further include determining features and a layout arrangement for HLSD widgets and generating a template thereof for the visual content.

19 Claims, 9 Drawing Sheets

(51) Int. Cl.
    *G06N 20/00*     (2019.01)
    *G06F 9/451*     (2018.01)
    *G06F 16/28*     (2019.01)
    *G06N 7/00*     (2006.01)

(56) References Cited

U.S. PATENT DOCUMENTS

| | | | |
|---|---|---|---|
| 11,119,907 B1* | 9/2021 | Gopal | G06F 8/75 |
| 2019/0228054 A1* | 7/2019 | Zhang | G06F 40/106 |
| 2019/0250891 A1* | 8/2019 | Kumar | G06K 9/6218 |
| 2021/0004578 A1* | 1/2021 | Coquard | G06N 3/04 |

OTHER PUBLICATIONS

Nadzeya Kiyavitskaya et al., "Applying Software Analysis Technology to Lightweight Semantic Markup of Document Text", [Online], pp. 1-10, [Retrieved from Internet on Oct. 14, 2022], <https://research.cs.queensu.ca/home/cordy/Papers/KZCMM_ICAPR05_LWSA.pdf>, (Year: 2005).*
"PCT International Search Report" by Israeli Patent Office in application No. PCT/US2020/061694, dated Jan. 24, 2021, 3 pages.
International Claims examined by Israeli Patent Office in application No. PCT/US2020/061694, Jan. 2021, 4 pages.

* cited by examiner

FIG. 2
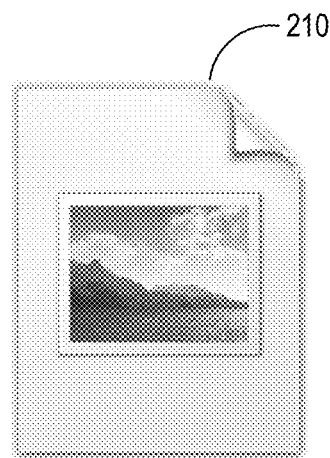 210
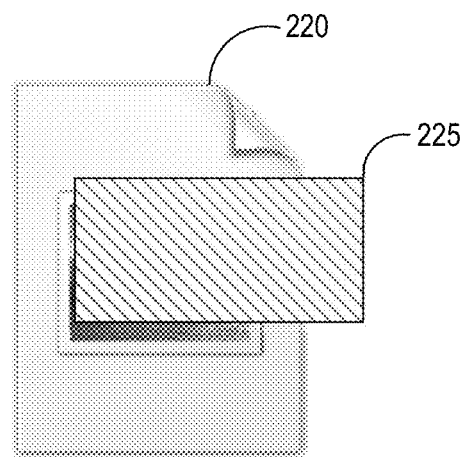 220
225
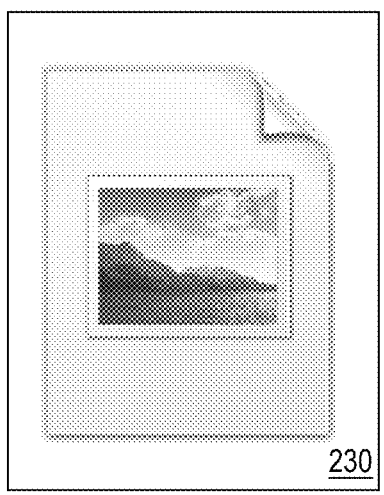 230
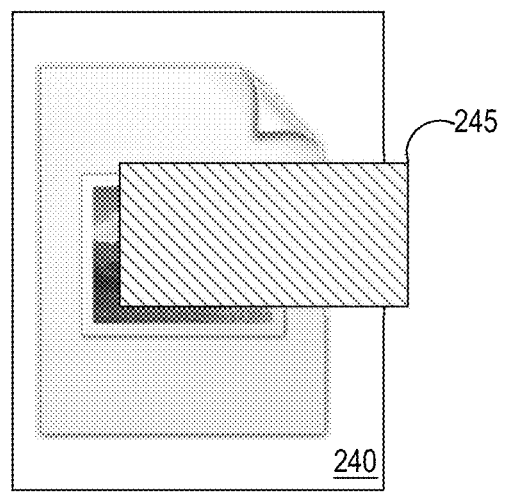 245
240

FIG. 7

```
{"id": "Gk01Hnm2","settings": {"layout":
"full_width","background_color": "rgb(1, 146,
74)","background_background": "classic","padding": {"unit": "px","top":
"0.0","right": "0.0","bottom": "16.12","left": "0.0","isLinked":
false}},"elements": [{"id": "7CdvyZQP","settings": {"_column_size":
   ,"_inline_size":    ,"content_position": "top","background_color":
null},"isInner": false,"elType": "column","elements": [{"id":
"fmfcGfSk","elType": "widget","settings": {"title":
"Hello!","header_size": "h1","title_color": "rgb(255, 255, 255)","size":
"large","align": "center","typography_typography":
"custom","typography_font_size": {"unit": "px","size":   ,"sizes":
[]},"typography_font_family": "Rubik","typography_text_transform":
"none","typography_font_style": "normal","typography_text_decoration":
"none","typography_font_weight": "700","typography_line_height":
{"unit": "em","size":     ,"sizes": []},"_background_background":
"classic","_background_color": "rgba(0, 0, 0, 0)"},"elements":
[],"widgetType": "heading"},{"id": "EliTiyaR","elType":
"widget","settings": {"editor": "What would you like to make
today?","text_color": "rgb(255, 255, 255)","align":
"center","typography_typography": "custom","typography_font_size":
{"unit": "px","size":   ,"sizes": []},"typography_font_family":
"Rubik","typography_text_transform": "none","typography_font_style":
"normal","typography_text_decoration": "none","typography_font_weight":
"500","typography_line_height": {"unit": "em","size":     ,"sizes":
[]},"_margin": {"unit": "%","top": "0","right": "0","bottom":
"0","left": "0","isLinked": true},"_background_background":
"classic","_background_color": "rgba(0, 0, 0, 0)"},"elements":
[],"widgetType": "text-editor"},{"id": "5eS1Dgng","elType":
"widget","settings": {"text": "Browse all projects","button_text_color":
"rgb(34, 34, 34)","background_color": "rgb(252, 246,
127)","border_radius": {"unit": "px","top": "5","right": "5","bottom":
"5","left": "5","isLinked": true},"border_border":
"solid","border_color": "rgb(252, 246, 127)","border_width": {"unit":
"px","top": "3","right": "3","bottom": "3","left": "3","isLinked":
true},"typography_typography": "custom","typography_font_size": {"unit":
"px","size":   ,"sizes": []},"typography_font_family":
"Rubik","typography_text_transform": "none","typography_font_style":
"normal","typography_text_decoration": "none","typography_font_weight":
"500","typography_line_height": {"unit": "em","size":     ,"sizes":
[]},"size": "xs","text_padding": {"unit": "px","top": "9.5","right":
"23.0","bottom": "9.5","left": "23.0","isLinked": false},"link": {"url":
"https://projects.raspberrypi.org/en/projects","is_external":
"","nofollow": ""},"_margin": {"unit": "%","top": "0","right":
"0","bottom": "0","left": "44","isLinked": false}},"elements":
[],"widgetType": "button"}]}],"isInner": false,"elType":
"section","col_str":  }
```

GENERATING HIGHER-LEVEL SEMANTICS DATA FOR DEVELOPMENT OF VISUAL CONTENT

BENEFIT CLAIM

This application claims the benefit under 35 U.S.C. § 119(e) of provisional application 62/938,954, filed Nov. 22, 2019, the entire contents of which is hereby incorporated by reference for all purposes as if fully set forth herein.

FIELD OF THE TECHNOLOGY

The present invention relates to the field of computer programming development technology, in particular to generating higher-level semantics data for the development of visual content such as web pages, mobile or desktop user interfaces.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web page content contains HTML trees of source element nodes, which are difficult to manually edit due to complexity, verbosity, specialized vocabulary, and many other factors. Moreover, HTML trees are not suitable for easy identification of correspondence between the portions of the source code of the HTML node of the tree and the rendered components visible to users. While a user appreciates the simplicity and the beauty of the rendered web page and may describe its content in higher-level semantics, these elements fail to relate to the underlying HTML source code (low-level semantics or no semantics). For example, a user may describe visual components of a web page in terms of a "menu block," "social links block," "image box block," "a section with three equal columns containing other blocks." However, HTML subtrees of nodes corresponding to each of the above-mentioned blocks may contain hundreds or more elements (having "div", "span", "a", "p", and other tags) of source code with lower-level semantics or no semantics at all.

This problem is particular to any kind of source code which lower-level semantics are complex compared to its visual representation. For example, vector graphics, like HTML, may contain complex content in low-level semantics, such as numerous geometric shapes and texts, which visually form a simpler representation.

Such complexity of the source (HTML or vector graphics) creates a barrier for the creation of templates from the existing lower-level source codes (e.g., HTML or vector graphics) for auto-generating customizable UI, web page, or other visual content (e.g., images) from templates generated from one or multiple different and same source codes (e.g., vector graphics to HTML page conversion and vice versa), and for simplifying the modification to existing visual content.

One approach to solve this problem is to import the source code for visual component(s) into a software platform for visual content development or image editing. For example, many such software platforms exist for importing/modifying/creating web pages. However, these software platforms typically maintain the same complexity of the source code even when the web page source code is converted to the platform's proprietary format. Therefore, while having features for editing/modifying existing visual content, these platforms fail to provide any simplification of the original source code.

BRIEF DESCRIPTION OF THE DRAWINGS

In the drawings of certain embodiments in which like reference numerals refer to corresponding parts throughout the figures:

FIG. 2 is a block diagram that depicts rendered overlapping image-like HTML nodes, in an embodiment.

FIG. 7 is an example of HLSD content (in JSON format) for a web-page builder application, in an embodiment.

DETAILED DESCRIPTION

Figure 1:
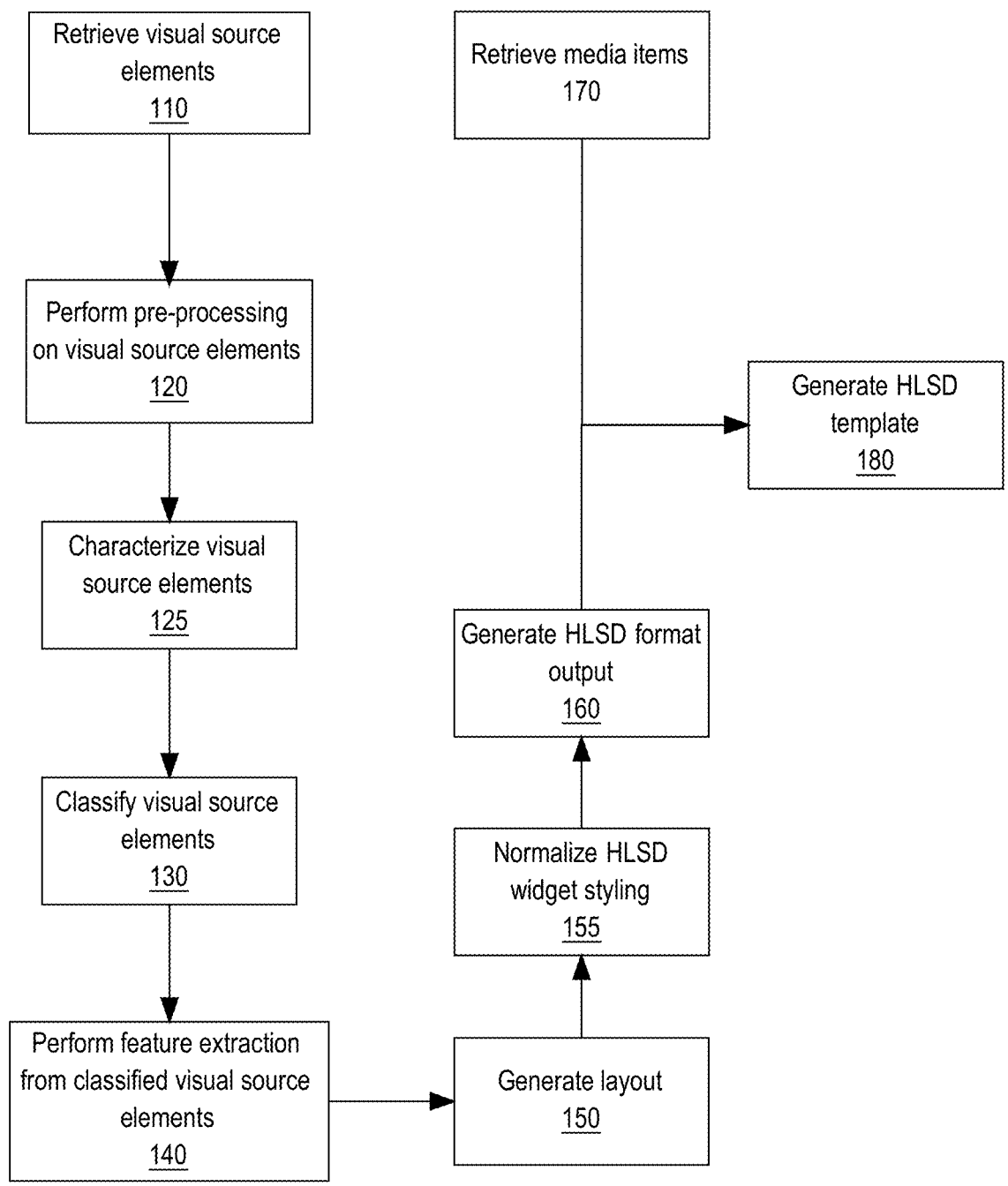
FIG. 1 is a flowchart that depicts a process to convert visual source elements (such as that of HTML and/or vector graphics) to higher-level semantics data (HLSD), in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Techniques are described to generate higher-level semantics data (HLSD) that corresponds to the visual rendering of low-level source code. The term "source code" or "visual content source code" refers herein to structured or semi-structured textual data that includes data structures/markup/commands/directives for a computer system to render visual content. The source code may be in the format of HTML, XML, markdown, JSON, or vector graphics, as non-limiting examples.

The "higher-level semantics data" (HLSD) term refers herein to data defining user interface component(s) as visually perceived when displayed. Accordingly, HLSD contains less detail about the user interface component(s) than the source code of the user interface component based on which the HLSD is generated. The HLSD may aggregate numerous source code elements into a single HLSD element. These HLSD elements may be arranged as structured and semi-structured data describing the corresponding visual component(s) as visually perceived and, in some cases, may include directives to properly render such components in visual content editing software or other rendering environments while leaving many less important details of rendering to the software or UI styling convention scheme.

The approaches herein describe generating HLSD from source code of visual components (e.g., HTML tree of nodes) and simplifying modification/creation of visual content using the HLSD. In an embodiment, HLSD features a tree-like structure of widgets (blocks) with attributes and layout arranging widgets (container blocks) in horizontal and vertical structures (rows and columns). The techniques may be used to generate semantic HLSD content in various formats, to be used as the desired input for available state-of-the-art UI builder or image editing programs. The techniques may be used to extract the layout and content of UI, web page, or vector image, thus creating templates to develop other visual content.

In an embodiment, original visual content (UI, web page, or vector image) source code is loaded and rendered. The rendering may yield visual source elements that were not part of the original visual content source code. The rendered visual source is arranged in a tree-like graph structure, each visual source element having a close neighbor visual source element (direct parent, direct child, or sibling) or more distant neighbor elements (e.g., parent of the parent, child of a child, or more distant sibling).

The rendered visual source elements are pre-processed to determine their visual perception for a user, in an embodiment. As part of pre-processing, the visual and positional attributes of the visual source elements are determined, if not already known. Based on the visual and positional attributes of the visual source elements, the elements are classified, and a layout of a template may be generated.

In an embodiment, using visual and/or positional attributes of visual source elements, the visual source elements are classified as certain types of HLSD elements. Multiple visual source elements may be aggregated into an HLSD element using the respective visual and/or positional attributes. In some embodiments, a visual source element may not be mapped to any HLSD widget because of the lack of its visual perception.

The set of the generated HLSD elements may form an HLSD template for visual content (UI/web page/vector graphic). A mobile app user interface or even a complete website may be generated from such an HLSD template.

Similarly, the source code of visual content (e.g., web page/mobile UI) may be classified into HLSD elements using the techniques described herein. Using the visual content representation in HLSD, the HLSD template is used for user-friendly modifications to the visual content. With HLSD, drag-and-drop visual content editor software solutions provide a simpler user interface for creating and customizing visual content, thereby lowering barriers of entry into web development. More importantly, because HLSD may be generated from one or multiple UIs, and an HLSD may be used to generate one or multiple instances of visual content, visual content development may be at least partially, if not fully, automated. From the modified HLSD template, new visual content may be generated by generating the corresponding source codes to render the new visual content.

HLSD Conversion

As described above, at least one purpose of source code to HLSD conversion techniques is to generate visual content representation data in higher-level semantics, which is easier to customize visually using visual content builder software.

FIG. 1 is a flowchart that depicts a process to convert visual source elements (that are formatted according to HTML, XML, JSON, and/or vector graphics) to HLSD, in an embodiment. One or more of the steps described below may be omitted, repeated, and/or performed in a different order. Accordingly, the specific arrangement of steps shown in FIG. 1 should not be construed as limiting the scope of the invention. Further, the steps shown below may be modified based on the data structure used to store the data.

The process analyses the visual content source code, such as HTML page content, similar to the user's visual experiences, and determines HLSD elements that make up the visual content. The conversion may be based on the classification of visual source elements in terms of HLSD labels. The term "HLSD label" or "label" refers herein to the type of an HLSD element. Various machine learning classification algorithms may be used for modeling the classification. The visual source elements may be first simplified and then classified according to the given set of labels, in an embodiment.

At step 110, the visual content for which an HLSD is to be generated is identified, and the process retrieves visual source elements of the visual content. The visual source elements may be retrieved directly from the source code. For example, if the source code is raw HTML that describes a tree of HTML nodes, each HTML node may be directly retrieved as a visual source element. Additionally or alternatively, the process requests the rendering of the source code, which, when executed by a computer system processor, causes the visual content to be rendered on the display for the visual perception of a user. Accordingly, the execution generates the final set of visual source elements for the visual content. For example, the HTML source code for a web page may be loaded and rendered in an HTML parser such as a web browser controlled by a software component (Selenium driver). The retrieval of the source HTML elements may include waiting for the page loading, scrolling to the bottom of the page, so that media content with delayed load and animations may complete their loading, and closing alerts and hiding some popups. Alternatively, the retrieval of the source HTML elements may be triggered by the loading of the source HTML elements to generate rendered HTML code. The process retrieves the HTML elements that are generated by the rendered HTML code.

Simplifying Visual Content

At step 120, the retrieved visual source elements are pre-processed. In an embodiment, visual source elements that are not visible are removed. The process may remove some nodes in an HTML tree, which are not visual, such as those containing script(s), style tag(s), and hidden node(s).

Additionally or alternatively, each visual source element is given a depth index. The term "depth index" or "z-index" refers herein to a numerical value that indicates the order of overlap in the arrangement of visual source elements in visual content. For example, the visual source element that is on top of all other visual source elements in the visual content may be assigned the highest depth index (and vice versa). When the visual source elements are fully rendered for displaying on a display, the process may determine the relative overlap of the visual source elements for the visual content. Based on the relative order that the visual source element is rendered compared to other one or more overlapping visual source elements, the process assigns a depth index to the visual source element. In an embodiment, a visual source element that has no overlap with any other visual source element, may be assigned to a default depth index.

The process, at step 120, may additionally determine if a visual source element has animation, i.e. dynamically changes its one or more display properties. For example, a visual source element may change its position or size based on an action by a user (e.g., scrolling). In one embodiment, the process determines the optimal value for the changing display property and assigns such value to the visual source element. Thereby, a dynamic visual source element is converted into a static visual source element to up-level and simplify the element representation for HLSD.

In another embodiment, the process determines that the visual source element has an animation aspect and based on such determination, generates one or more properties that describe the animation at a higher-level for HLSD. For example, the newly generated animation property(s) may describe the type of animation (e.g., size increase, movement, color change) and the animation itself (e.g., minimum and maximum size, motion coordinates, set of colors, respectively).

Additionally or alternatively, the process may distinguish foreground image from a background image based on the visual rendering of visual source element(s). A visual source element may be an image but have another visual source element overlapping the image and thus make the image look like a background image rather than a foreground image. Similarly, a visual source element may have an image as a background but the element itself be transparent and thus, when rendered, be visually as a foreground image. Thus, a visual source element, which is rendered as an image thus perceived as one, may be assigned a property indicating a foreground image. And similarly, an image based visual source element, which is rendered overlapped or in a background of another visual source element, may be assigned a property indicating a background.

FIG. 2 is a block diagram that depicts rendered overlapping image-like HTML nodes, in an embodiment. Nodes 210 and 220 are image nodes, however node 225 is rendered to overlap node 220. Because node 210 is unobstructed when rendered, node 210 is assigned a property to indicate that a foreground image. On the other hand, node 220, having node 225 overlapping, is assigned a property indicating a background. Node 230 is a node having an image as its background. However, node 230's image, when rendered, is fully visible and unobstructed, and therefore a property indicating a foreground image is assigned to node 230. Node 240 similarly has an image as its background but is further overlapped by another HTML node 245. Because of the HTML node 240 being rendered in the background of HTML node 245, node 240 is assigned a property indicating a background.

At step 125, the visual source elements are characterized using higher level properties. The term "higher-level property" refers to a property of a visual source element that is visually readily perceived (dominant) when the visual source element is rendered on a display. In an embodiment, the process may use a predefined set of different properties that are extracted for each visual source element type. The set may depend on the type of the visual source element. The set may include the generated properties during the pre-processing such as the depth index and/or animation property.

For example, the process may obtain a subset of properties from a visual source element, such as geometry (size and/or location within a rendered visual content) and certain style attributes from among existing attributes of the visual source element. A column visual source element may be a rectangle with a rounded angles, with a particular shading of a particular color. The process may only extract the color and rectangular shape as part of the characterization attributes of the column visual source element. The other attributes may be ignored, thus reducing the number of attributes per visual source element and keeping only visually the most important ones. The reduced information per node lessens the dimensionality of the feature vector used in machine learning (ML) algorithm for classification.

For further reduction of the data, the process may eliminate some visual source element(s) that do not provide any useful information, such as same-size wrappers and zero-size visual source elements. The process may also generate additional set of features from source code to be used in the ML algorithm for classification. These features include one or more of: number of images, videos, links and iframes in node subtree, relative area occupied by text, total length of visible text content, number of background images which are not covered by other nodes, the depth of the node in the simplified tree, number of siblings and subtree nodes etc.

At step 125, the arrangement of the visual source elements is modified to simplify the arrangement. The "simplified element arrangement" term refers herein to arrangement of lesser visual source elements than in the original source code while preserving the visible layout for the original visual content generated by the original source code. For example, simplified tree is a simplified arrangement for HTML or vector graphics. Simplified tree of the original HTML tree or vector graphics includes the subset of nodes and attributes that reflect the visible layout. For example, for HTML, tree of nodes, the hierarchy of nodes is simplified by restructuring of the nodes. Tree restructuring includes techniques for restructuring tree nodes in such a way that larger elements are always placed above (higher in the tree hierarchy) overlapping smaller ones. After restructuring, the parent-child relationship between nodes is simplified to reflect the respective visual and semantic appearance on the web page, which may not match the original HTML source code.

High level properties of visual source elements are further simplified, in an embodiment. The values for a particular type of a higher level property for a particular type of visual source element may be normalized based on the other values for the same high level property. The normalized value is then used as a higher level property of the visual source element. For example, the font size for the textual content of visual source elements may be indicative whether a particular visual source element should have large font size as the value, normal, or small for the higher level property. At least based in part on this higher level property, the visual source element may be classified as a large heading, small heading, normal text.

To determine the normalized value, statistical functions (e.g., mean, median, standard deviation) are applied to the font size higher level property values to determine which property values are relatively greater, smaller, or normal. If the average font size for the visual source elements is 20 pixels, then a visual source element with 24 pixels may not be assigned to have a large font size. However, if for the same example, the average font size is 12 pixels, then the visual source element may be assigned a normalized higher level property for the font size with value indicating large font size.

Feature Extraction

Continuing with FIG. 1, at step 140, the process proceeds to perform feature extraction from the classified visual source element(s). (FIG. 1, at step 130, see below in the Classifying Visual Content section.) Feature extraction is a recursive and rule-based process and is tuned for each label, in an embodiment. Feature extraction may generate backgrounds, borders, shapes, titles, text descriptions, images layout, and other data of classified visual source elements.

The extracted features from the elements are processed to output the HLSD format of the visual source element(s), HLSD widget. Given the label of the node, a feature extraction process determines common features of labels, such as border(s), background-color(s), background image(s), background-like video(s), their size(s) and alignment(s), also taking into account that the element may be just a wrapper, and the real meaningful content may be in its subtree. The label-specific extraction may vary in different embodiments. Using these techniques, the most important and required content parts corresponding to the given classified label are considered for the final look as a widget.

For example, a pricing list widget may have a large text with price, a heading, a list of features of a product, a button, and other descriptive texts. In such an example, the process searches for the numerical values accompanied by some currency characters, chooses the largest among them as the price value, extracts its typography styles, such as font size, color, boldness, line height, font. For the remaining content of the HTML subtree, the process seeks the largest heading (as classified by the ML algorithm), which is identified to be product title and extracts its styles. In the same way, a button or list may be searched for and identified. The remaining text content is extracted as a text description feature of the widget.

Feature extraction of some widgets includes finding its layout by inspecting the mutual alignment of its parts, in an embodiment. Layout extraction of a widget may be performed by segmentation process, similar to the layout extraction of containers, rows, and columns, as described below (see FIG. 5, step 530). In an embodiment, extraction of text content is improved by eliminating hidden texts, texts overflowed across the borders of parent elements, minor size texts and other textual content which are not visible when rendering visual content, but exists for non-visual purposes.

For each label, the feature extraction process may detect misidentification of a label when the labeled element's feature does not satisfy certain criteria. For example, the menu element is misidentified, if an element is classified as a menu with a list element in the subtree, but there is a button outside of the list. As another example, if an element classified as call-to-action does not have any button inside, or image box does not have any big enough image inside, then these HLSD elements are misidentified by the extraction process. The HLSD elements with failed identifications are treated as containers when constructing the layout, in an embodiment. However, the subtree elements of the misidentified elements may be selected as actual widgets during the recursive process in the next step.

Figure 5:
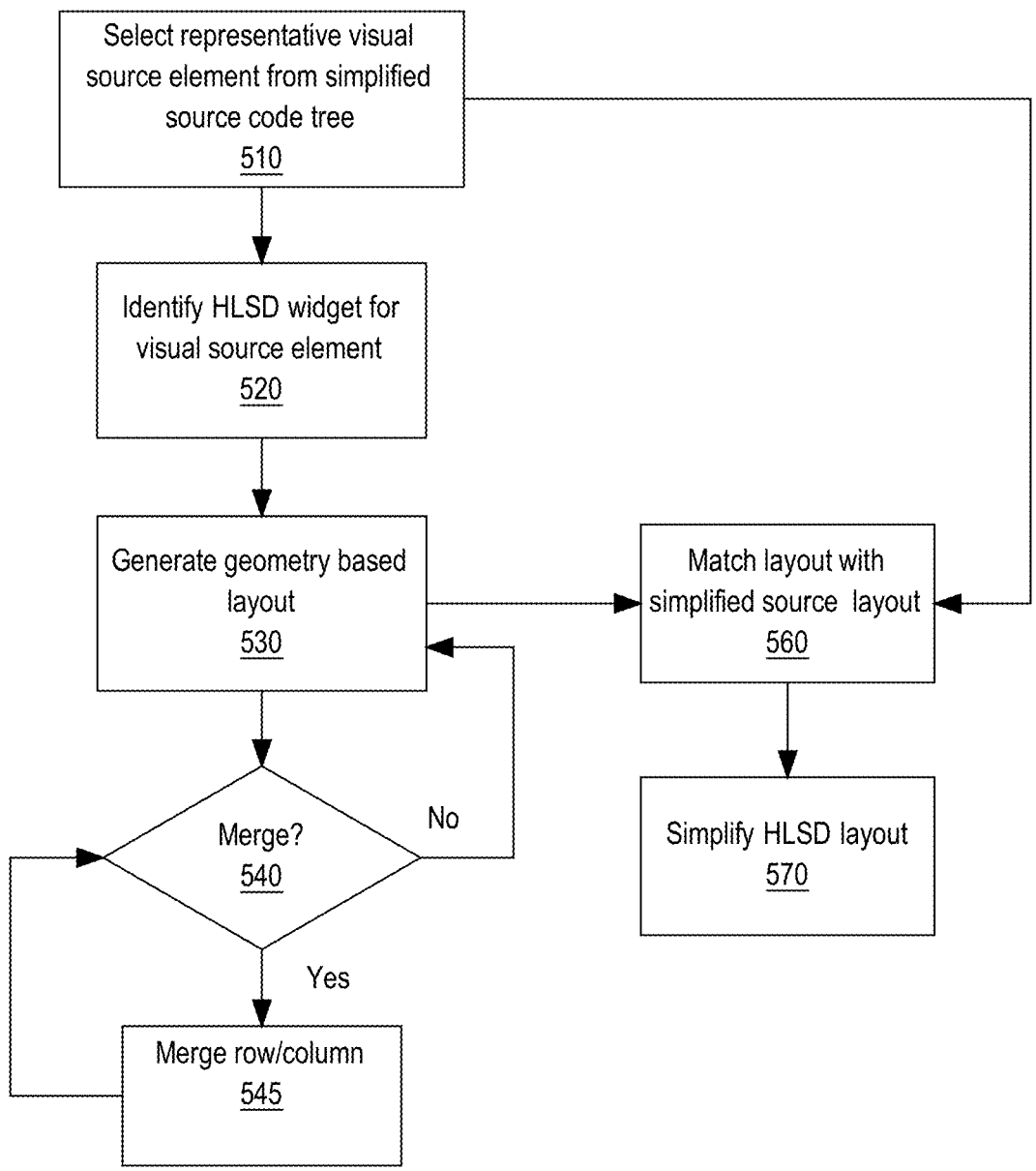
FIG. 5 is a flowchart that depicts a process to create a content layout based on classified visual source elements and extracted features, in an embodiment.

Continuing with FIG. 1, at step 150, the process generates a layout for HLSD representation. In an embodiment, the layout generation may contain several steps. FIG. 5 is a flowchart that depicts a process to create a content layout based on classified visual source element and extracted features, in an embodiment. One or more of the steps described below may be omitted, repeated, and/or performed in a different order. Accordingly, the specific arrangement of steps shown in FIG. 5 should not be construed as limiting the scope of the invention. Further, the steps shown below may be modified based on the data structure used to store the data.

A subset of classified visual source elements and the extracted features thereof are selected as widgets for the HLSD representation. The visual layout of the visual content is constructed based on the original layout or geometry of the widget(s). The generated layout is matched to the original simplified layout to generate matching HLSD containers, which are rows and columns, and their background styles are matched. The HLSD containers may contain one or more widgets. Accordingly, the resulting output tree is further simplified.

At step 510, the process selects each visual source element of the simplified source code (rendered tree) which has been classified and extracted (or failed extraction). The process may determine which visual source element reflects visual content the best way as perceived by the user. Based on the label for the selected visual source element, an HLSD widget is selected for the visual source element. Additionally, the HLSD widget may satisfy the following criteria: there should be no other widget, which is located on the same branch (ancestors-descendant pair) of the simplified tree.

At step 520, the process identifies an HLSD widget for a visual source element. When selecting the widgets, the priority matrix may be used, which defines priorities between any parent-child pair of labels, including of the same label, in an embodiment. For an HTML, tree of nodes, a recursive process traverses through the tree nodes, e.g., from a parent node to child node(s), and determines whether a successfully extracted node is a representative widget and, if not, whether such node is to be skipped in favor of its children nodes (which are further down the tree). Priority matrix is tuned to achieve the best balance between small but detailed widgets and large but not effectively representative widgets, with the best HLSD output semantics in view. When selecting representative widgets, visual source elements classified as containers as well as nodes with failed feature extraction are passed and not selected, and the nodes classified as having "ignore" labels are not selected along with their whole subtree, in an embodiment.

Figure 6A:
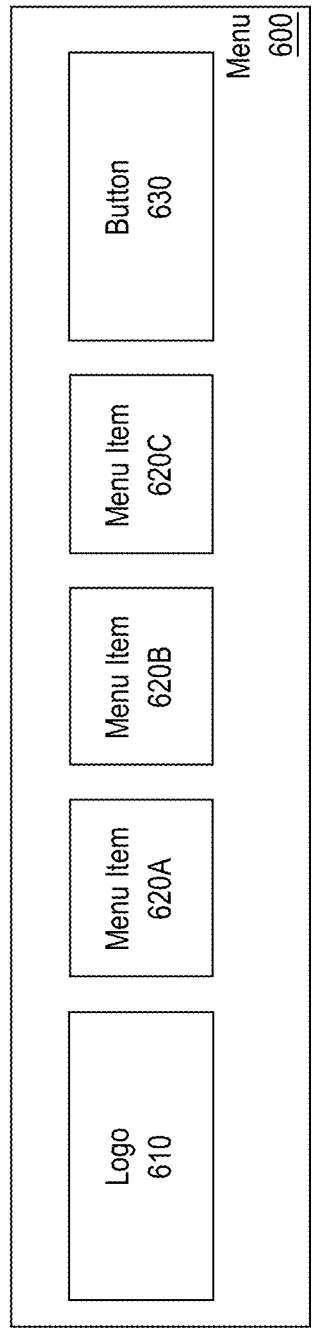
FIGS. 6A and 6B are block diagrams that depict HLSD widgets, in an embodiment.
Figure 6B:
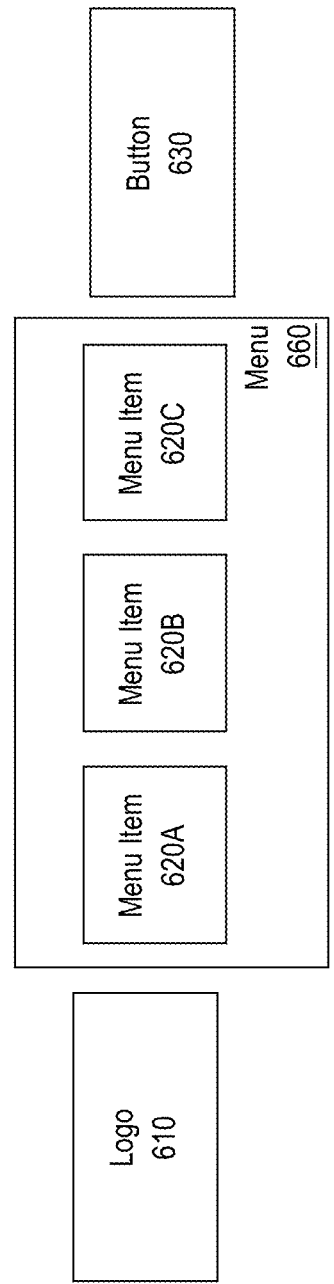

In an embodiment, based on the classification process, a widget may include sub-elements. The sub-elements may be separated from the HLSD widget into their own respective widgets. The process may then determine whether the new sub-element widgets would stay separate or merged back within their own HLSD containers. FIG. 6A is a block diagram that depicts a mis-identified HLSD widget, in an embodiment. Widget 600 is misidentified as a "menu" because it contains widget 610, "logo" and button 630 besides menu item list 620A-C. Based on detecting multiple sub-widgets, the process may split widget 600 into multiple widgets, as depicted in FIG. 6B. After splitting, Logo 610 and button 630 are separate, while widget 660 contains menu items 620A-C. Each of these widget may be included in separate containers, one or many of them may be merged together.

At step 530, the layout construction process takes representative widgets as an input and returns the HLSD layout tree. In some embodiments, a layout tree is made of nested HLSD containers (rows and columns) with the HLSD widgets nested inside. Algorithms for creating layout may be purely based on geometry, and layout may be generated by a recursive segmentation process. Additionally or alternatively, the algorithm for creating the layout may be purely source tree-based or a combination of geometry-based and tree based. In the latter case, in an embodiment, the first layout approximation is based on geometry of the source, which is then adjusted based on the original tree layout. As an example of layout adjustment, using the depth index, the process may detect that representative widgets overlap. The process may assign a separate HLSD container to each widget and then, may shift the containers apart to remove the overlap.

Sequential rows and columns are generated, each cell fully containing widgets. HLSD representation-specific properties are a) the maximal depth of the layout tree, b) the maximum number of columns in a row, and/or other constraints on the sizes of containers. These properties may vary based on the HLSD model.

At step 540, when generating rows and/or columns, the process determines whether to merge two adjacent rows (including widgets). In an embodiment, the process determines the merging based on a simple binary classifier, pre-trained ML algorithm, which makes decisions based on geometry, tree ancestry, backgrounds, and other parameters of adjacently placed widgets. In some embodiments, this is a logistic regression function. At step 545, if determined to be merged, the process merges the row/column container.

Matching of the constructed HLSD layout tree to the original simplified layout is performed at step 560 to obtain backgrounds and other styles of layout tree containers, in an embodiment. Flexible tree matching or other rule-based tree-matching algorithms are used in some embodiments. For example, HLSD layout tree containers are matched to the simplified layout based on the background color, background image, background video, and geometry. One to one, one to many, and many to one tree-to-tree matching algorithms may be performed.

In an embodiment, based on the separation of corresponding visual source elements, the respective HLSD layout block may have inner and outer spacings which may be calculated and adjusted to match the original layout spacings, as rendered, with the best approximation.

Additionally, if the visual source element has fixed position (e.g., rendered on top of display and stays there even when scrolling), the HLSD container that contains the corresponding HLSD widget is assigned the same property to keep it static.

HLSD tree simplification is performed at step 570 by removing unnecessary complexity of nested containers, taking into account whether the HLSD container contains specific styling such as non-transparent background. The containers with styling may be maintained after the simplification.

Continuing with FIG. 1, the layout of HLSD generated at step 155 may be further improved. For example, the process may examine the variety of colors, font sizes, and fonts used throughout the HLSD widgets for the visual content. Based on the diversity of values for one or more of these properties, the process may determine to standardize values for these properties. The process may select a set of possible property values to adjust with for multiple HLSD widgets a certain property (e.g., font, font size, color). These adjustments provide aesthetic improvement, accessibility and/or optimization for the resulting visual content. The set of property values may be pre-defined and may not include any of the property values.

The output HLSD data format depends on the application used to edit visual content, for example, may depend on a particular visual content editor. At step 160, the process performs the format conversion of the generated HLSD. In some embodiments, HLSD is generated for multiple instances of visual content (e.g., a whole website template with multiple pages is created). Additionally, the process may analyze original source code to separate different portions of the source code and generate separate templates corresponding to the portions, such as headers or footers. In case of several input sources, a common template for each portion (e.g., header and footer) may be generated. FIG. 7 is an example of HLSD content (in JSON format) for a web-page builder application, in an embodiment.

Continuing with FIG. 1, at step 170, the process may download, optimize and or modify media used by the visual content and generate instructions to import the media with HLSD. Different widgets may require third-party software, such as plugins to install, e.g., slider, gallery, form, etc. Accordingly, instructions that include external links to such software, may also be included with HLSD. Additionally or alternatively, the process may download additional media items to replace the existing one. For example, the process may download original fonts or replace the original fonts with others because the original font may be proprietary. At step 180, the process generates a template that includes the generated HLSD content and may further include the downloaded media and any additional directives necessary for visual content editing software platforms.

Classifying Visual Content

Continuing with FIG. 1, at step 130, the process proceeds to classifying visual content into HLSD elements. In one embodiment a visual content may be classified without generating a simplified element arrangement and/or simplified visual source elements, while in another embodiment the simplified source elements are input to the classification. Although the techniques described herein refer to the simplified visual source elements, the techniques are similarly applicable to the non-simplified visual source elements. With the non-simplified source elements, the techniques only use the original property(s) of the elements rather than additionally leveraging the higher-level properties of the corresponding simplified visual source element as described herein.

In one embodiment, machine learning techniques are used for classifying the visual source elements of the visual content. Using a simplified arrangement, data population and processing algorithm runs before training machine learning model. Alternatively, an already trained model to make classification predictions is used. For the training set, a statistical analysis of textual values of visual source element attributes (e.g. "class", "id", "tag" of element or its subtree in case of HTML source) may be performed. Additional features vector components (scores) may be calculated, which indicate the similarity between the test/prediction set and the train set labels, based on the similarity determined for these attributes values.

Additionally or alternatively, a sibling similarity index is calculated for each visual source element based at least in part on geometry (sizes and position) and/or subtree similarities between a given visual source element and its siblings and other nodes with the same depth in the simplified arrangement. Normalization of depth in the arrangement is performed based on simple tree models, in an embodiment. Categorical feature vector components extracted from properties of visual source elements are converted into numerical data using an encoding, such as One Hot Encoding. To reduce the dimensions for performing One Hot Encoding, simplification or pre-grouping of categorical feature vector components may be performed, especially in the case when the number of categories is large.

Figure 3:
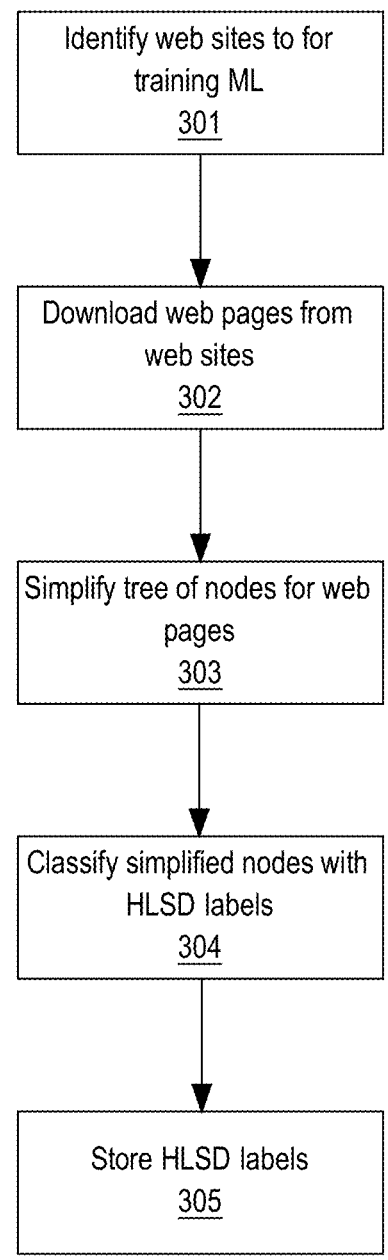
FIG. 3 is a flowchart that depicts a process for collecting HTML-based data to train machine learning (ML) algorithms, which converts HTML into HLSD, in an embodiment.

FIG. 3 is a flowchart that depicts a process for collecting HTML-based data to train machine learning (ML) algorithms, which converts HTML into HLSD, in an embodiment. One or more of the steps described below may be omitted, repeated, and/or performed in a different order. Accordingly, the specific arrangement of steps shown in FIG. 3 should not be construed as limiting the scope of the invention. Further, the steps shown below may be modified based on the data structure used to store the data.

To collect HTML data with the purpose of training machine learning ML algorithms, a set of websites are identified at step 301, for example, a subsample of Alexa top million sites is selected.

In an embodiment, to have the full data set to train an ML model, web pages of the identified web sites are downloaded, at step 302. These cached web pages may be used to have more isolated and static content. Having unchanged/static data, such as cached web pages, enables running the algorithms over and over on the same data to produce a consistent model. During downloading, the resources of a web page, such as the images, fonts, and external styles and scripts, are being retrieved and downloaded, and their links are modified to point to the downloaded content. After web pages are cached, the web pages are simplified by using the simplifying techniques described herein on the cached data, at step 303. The resulting simplified trees of nodes may be stored in the database.

Using an application, such as an extension of a browser, classification data is collected for the simplified tree nodes, based on the user input to the application, at step 304. The application retrieves simplified tree nodes (e.g., via API) and renders them as boxes over the actual web page from which it was extracted. A user may browse the simplified trees using the application to check the features of each node and request the node to be classified as an HLSD label. After the classification, the classification data may be stored in the database at step 305. The number of different HLSD labels may range from 20 to 40 and vary according to some embodiments for different page builder application inputs. As an example, a classification model may be generated based on 20,000 classified nodes of HTML tree from about 2,000 different web pages.

The amount of classified data (visual source elements and their corresponding HLSD labels) may not be sufficient for training of data-intensive algorithms, such as Deep Neural Networks (DNN) and in particular, recurrent neural networks (RNNs).

Figure 4:
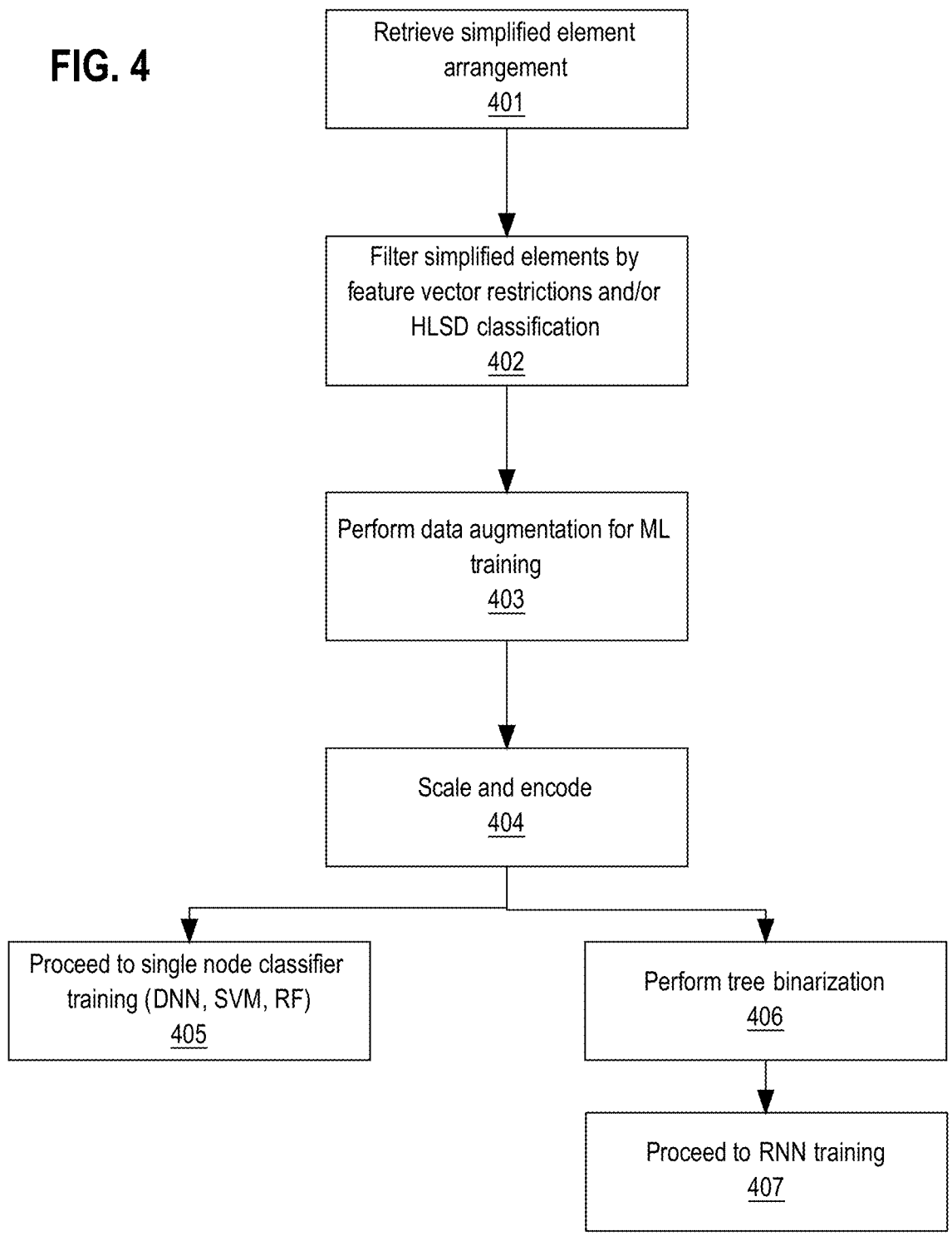
FIG. 4 is a flowchart that depicts a process for data augmentation and training of machine learning (ML) algorithms for HLSD classification, in an embodiment.

FIG. 4 is a flowchart that depicts a process for data augmentation and training of machine learning (ML) algorithms for HLSD classification, in an embodiment. One or more of the steps described below may be omitted, repeated, and/or performed in a different order. Accordingly, the specific arrangement of steps shown in FIG. 4 should not be construed as limiting the scope of the invention. Further, the steps shown below may be modified based on the data structure used to store the data.

At step 401, the simplified visual source element are retrieved. At step 402, simplified visual source elements are filtered based on feature vector restriction which may be configured to avoid outliers. The filtering may eliminate human errors derived from manual classification for the training set. In an embodiment, the retrieved simplified visual source elements may not correspond to the feature vector for which training data is to be augmented.

At step 403, several augmentation techniques are implemented for various labels to generate more artificial data based on the existing subsets. For example, swapping of properties of visual source elements may be used for data augmentation.

In an embodiment, such techniques are semi-supervised learning, augmentation based on feature vector components probability density function, and swapping of components. The artificial data may be generated based on correlated properties of the feature vector and the restrictions placed upon them by augmenting the data within configured constraints. These restrictions are placed on a training/test/production data set and are used for reclassification as well.

At step 404, the process proceeds to conforming the generated augmented data to the feature vector to be used as input for training an ML algorithm to yield an ML model for HLSD classification.

In an embodiment, the process proceeds to generate a classification ML model using recursive or recurrent (RNN) algorithms, such as LSTM, at step 407. Such algorithms may take into account the context of visual source elements and may perform better than single node classification algorithms on large data, as performed in another embodiment at step 405. Tree binarization may be performed before feeding the data to RNN at step 406. The memory of the LSTM network learns the context of each visual source element, i.e., its relation to nearby elements, similar to Natural Language Processing techniques. More data may be generated for RNN training, pre-classification of visual content tree by DNN is used and may be further manually adjusted misclassification cases before feeding to RNN.

An example feed-forward DNN may include an input layer corresponding to feature vector components, two dense inner layers with 20-40 units, and an output softmax layer with classification vector components. L2 regularization, batch normalization, and ReLU activation function and dropout in inner layers may be used, and Adam optimization algorithm has been used for training.

To avoid outliers in classification, one or more rules are applied to ensure that the machine learning model output satisfies label condition. There may be a configured number of attempts at classifying a label based on vector restrictions. For example, if the result of the classification performed based on feature vector restrictions violates a label condition, the rule may specify that the next label may be given a priority for the classification because the next label's probabilities are within the threshold of the originally classified label. In such an example, if the classified label does not satisfy feature vector restrictions, the second most probable classification label is chosen. If it also fails, the third one is chosen. If the third one also fails, the visual source element is classified as a container, as an example of three classification attempt label condition rule.

Additionally or alternatively, if, as a result of classification, the label with the highest probability does not satisfy feature restrictions, a reclassification rule is applied based on the context of the classified visual source element, specifically properties of its close or distant neighbors. In particular, the reclassification retrieves the HLSD labels and/or properties of the neighboring visual source element. Based on the retrieved information, the process makes a determination with which label to classify the visual source element. Accordingly, the label is classified for the visual source element based on the surrounding context.

Vector Graphics to HLSD Conversion

The vector-graphics-to-HLSD conversion generates data of higher-level semantics, which is easier to customize visually using a visual content builder application than directly exported HTML. Similar steps as described herein are used to analyze vector graphics and generate HLSD for vector graphics. Vector graphics are primitive shape-based and typically have a much lesser depth of tree (grouping) than HTML trees. The difference in steps may include an additional step of vector graphics conversion to HTML. In another embodiment, vector graphics are parsed, with its elements and their attributes and global attributes by a custom parser. As a result, a simplified tree is generated for the input to the algorithm.

In an embodiment, ML algorithms utilize supervised learning training based on the parsed data from vector graphics. Data labeling may be performed using an add-on of the vector graphics processing application. In an embodiment, labels are saved inside the vector graphics files, not in a database, as in the case of HTML input. In some embodiments, user-generated labels are used for creating HLSD content from vector graphics, thus skipping the ML classification step.

Software Overview

Figure 8:
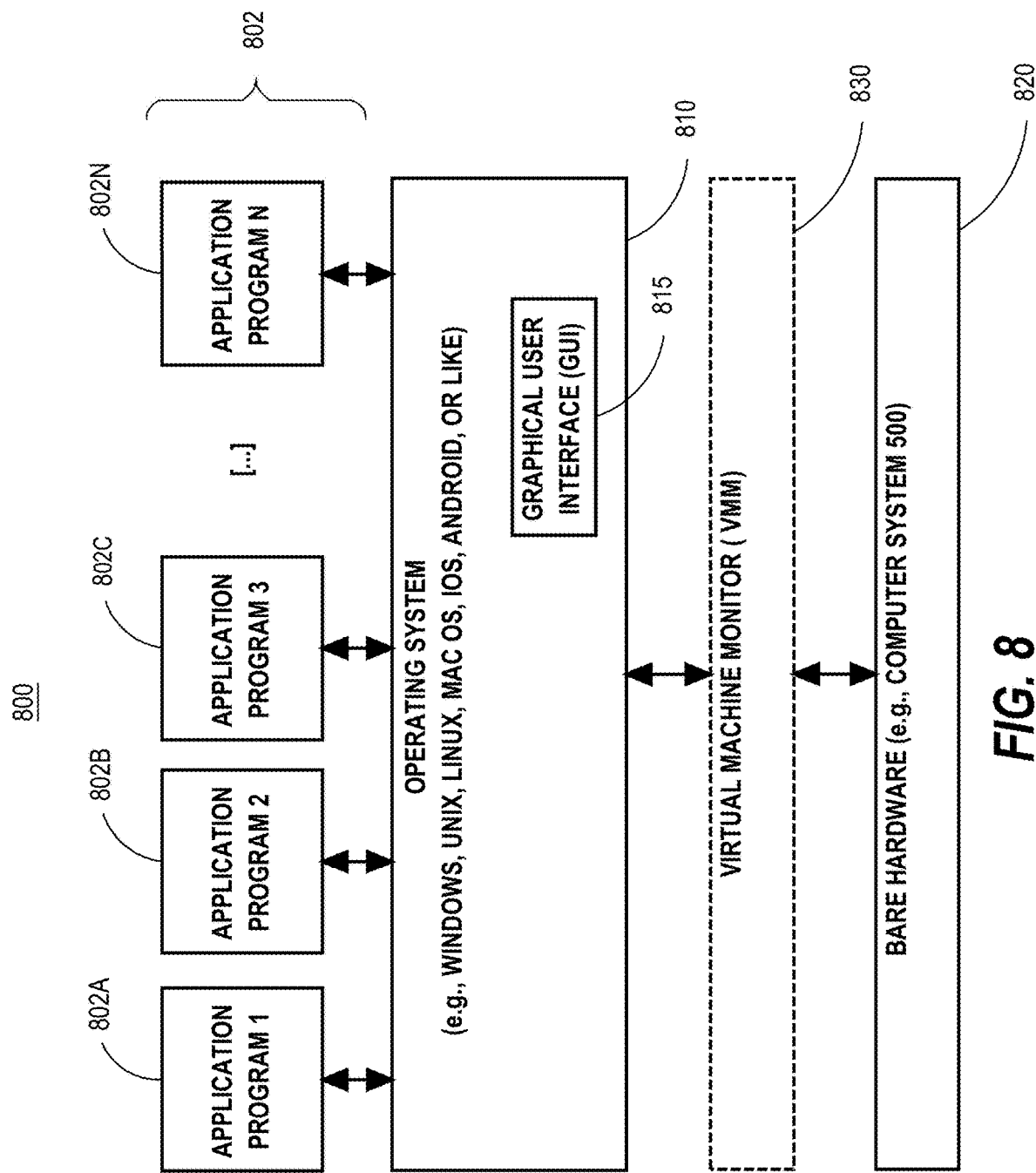
FIG. 8 is a block diagram of a basic software system, in one or more embodiments.
Figure 9:
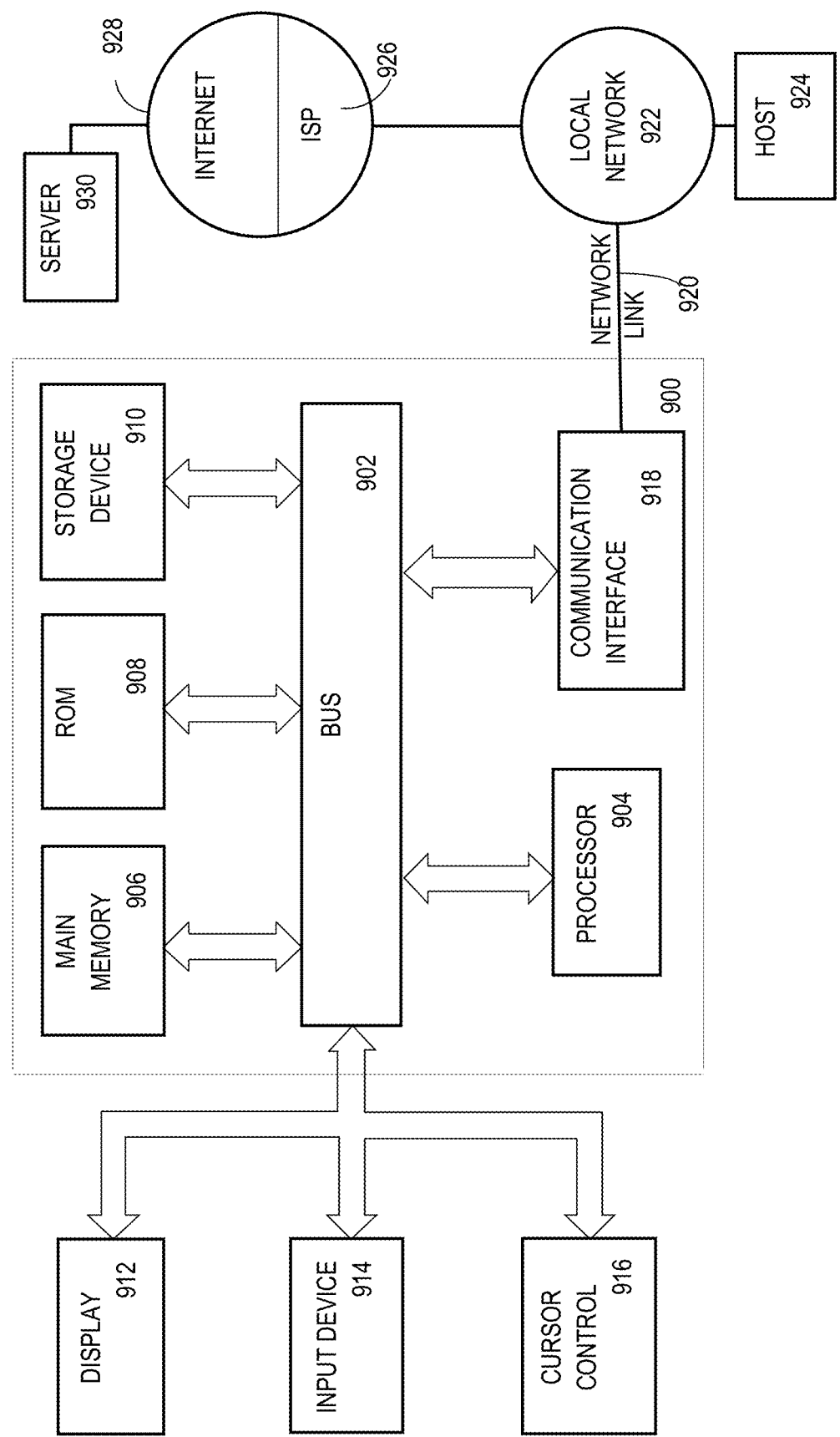
FIG. 9 is a block diagram that illustrates a computer system upon which an embodiment of the invention may be implemented.

FIG. 8 is a block diagram of a basic software system 800 that may be employed for controlling the operation of computing system 900 of FIG. 9. Software system 800 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 900. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or another online service).

Software system 800 includes a graphical user interface (UI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The UI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or another dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read-only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world wide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
retrieving source code, which, when rendered, causes display of visual content, the source code comprising a plurality of visual source elements in a textual format, which, when rendered, generate a tree hierarchy of visual source elements;
from one or more particular properties of a particular visual source element of the source code, determining a first set of properties of the particular visual source element that affect the display of the visual content;
generating a second set of properties, different from the one or more particular properties, of the particular visual source element that represents visual, positional or semantic attributes based on rendering the particular visual source element;
classifying the particular visual source element of the source code to a particular label of higher-level semantic data (HLSD) based at least in part on one or more neighbor properties of a neighbor visual source element of the particular visual source element and based at least in part on the first set of properties and the second set of properties;
wherein the particular HLSD label indicates a type of HLSD widget assigned to the particular visual source element;
determining features and a layout arrangement, for a particular HLSD widget corresponding to the particular HLSD label, based at least in part on the one or more particular properties of the particular visual source element and the one or more neighbor properties of the neighbor visual source element;
generating a template for the visual content that at least includes the particular HLSD widget.

2. The method of claim 1, further comprising:
determining that an original visual source element of the source code when rendered has no effect on the rendered visual content;
excluding the original visual source element from the generating the template for the visual content.

3. The method of claim 1, further comprising:
identifying a particular plurality of properties from the particular visual source element and a neighbor plurality of properties from the neighbor visual source element;
generating a feature vector for the particular visual source element that includes values based on values of the particular plurality of properties and values of the neighbor plurality of properties;
based at least in part on the feature vector, generating a set of probabilities for a set of corresponding labels of HLSD to map to the particular visual source element;
classifying the particular visual source element to the particular HLSD label from the set of corresponding labels of HLSD based at least in part on the set of probabilities.

4. The method of claim 1, further comprising:
downloading one or more web pages from one or more web sites;
retrieving downloaded source code from the one or more web pages;
generating a training data set from the downloaded source code, which identifies a training set of feature vectors and an output set of labels of HLSD;
performing a training of a machine learning algorithm using at least in part the training data set thereby generating a machine learning model for determining labels of HLSD for the plurality of visual source elements.

5. The method of claim 1, wherein classifying the particular visual source element of the source code to the particular HLSD label comprises:
determining a different HLSD label has the highest probability to map to the particular visual source element;
applying a reclassification rule to the particular visual source element;
based on the one or more neighbor properties of the neighbor visual source element, determining that the reclassification rule is satisfied thereby reclassifying the particular visual source element from the different HLSD label to the particular HLSD label.

6. The method of claim 1, further comprising:
identifying a child visual source element of the particular visual source element;
based on priority configuration data, comparing one or more properties of the particular HLSD widget with one or more properties of a child widget of the child visual source element;
based on comparing the one or more properties of the particular HLSD widget with the one or more properties of the child widget of the child visual source element, determining that the particular HLSD widget is a representative widget;
excluding the child widget from the template.

7. The method of claim 1, further comprising:
generating the layout arrangement of widgets for the template that includes the particular HLSD widget and a neighbor widget of the HLSD particular widget by:
arranging, within the layout arrangement, the particular HLSD widget with the neighbor widget based on a geometrical relationship between the particular HLSD widget and the neighbor widget, and adjusting the layout arrangement based on a geometry of visual source elements located higher in the tree hierarchy with respect to the particular visual source element corresponding to the particular HLSD widget.

8. The method of claim 1, further comprising:
generating the layout arrangement of widgets for the template that includes the particular HLSD widget arranged with another widget on adjacent rows or adjacent columns;
determining whether to merge the adjacent columns or the adjacent rows by applying a classifier algorithm to geometry-based, hierarchical, or background properties of the particular HLSD widget and the other widget, or
determining whether to split one column/row into the adjacent columns or the adjacent rows by applying a classifier algorithm to geometry-based, hierarchical, or background properties of the particular HLSD widget and the other widget.

9. The method of claim 1, further comprising:
based on configuration data, modifying a value of a particular property of the particular HLSD widget, wherein the particular property is one or more of: font type, font size, color, and style.

10. The method of claim 1, wherein the textual format is based on HTML, markdown, vector graphics, JSON, or XML.

11. A system, comprising:
a hardware processor; and
a memory, coupled to the hardware processor and comprising a set of instructions stored thereon which, when executed by the hardware processor, cause the hardware processor to perform:
  retrieving source code, which, when rendered, causes display of visual content, the source code comprising a plurality of visual source elements in a textual format, which when rendered generate a tree hierarchy of visual source elements;
  from one or more particular properties of a particular visual source element of the source code, determining a first set of properties of the particular visual source element that affect the display of the visual content;
  generating a second set of properties, different from the one or more particular properties, of the particular visual source element that represents visual, positional or semantic attributes based on rendering the particular visual source element;
  classifying the particular visual source element of the source code to a particular label of higher-level semantic data (HLSD) based at least in part on one or more neighbor properties of a neighbor visual source element of the particular visual source element and based at least in part on the first set of properties and the second set of properties;
  wherein the particular HLSD label indicates a type of HLSD widget assigned to the particular visual source element;
  determining features and a layout arrangement, for a particular HLSD widget corresponding to the particular HLSD label, based at least in part on the one or more particular properties of the particular visual source element and the one or more neighbor properties of the neighbor visual source element;
  generating a template for the visual content that at least includes the particular HLSD widget.

12. The system of claim 11, wherein the set of instructions includes instructions, which, when executed by the hardware processor, cause the hardware processor to further perform:
  identifying a particular plurality of properties from the particular visual source element and a neighbor plurality of properties from the neighbor visual source element;
  generating a feature vector for the particular visual source element that includes values based on values of the particular plurality of properties and values of the neighbor plurality of properties;
  based at least in part on the feature vector, generating a set of probabilities for a set of corresponding labels of HLSD to map to the particular visual source element;
  classifying the particular visual source element to the particular HLSD label from the set of corresponding labels of HLSD based at least in part on the set of probabilities.

13. The system of claim 11, wherein the set of instructions includes instructions, which, when executed by the hardware processor, cause the hardware processor to further perform:
  downloading one or more web pages from one or more web sites;
  retrieving downloaded source code from the one or more web pages;
  generating a training data set from the downloaded source code, which identifies a training set of feature vectors and an output set of labels of HLSD;
  performing a training of a machine learning algorithm using at least in part the training data set thereby generating a machine learning model for determining labels of HLSD for the plurality of visual source elements.

14. The system of claim 11, wherein the set of instructions includes instructions, which, when executed by the hardware processor, cause the hardware processor to further perform:
  determining a different HLSD label has the highest probability to map to the particular visual source element;
  applying a reclassification rule to the particular visual source element;
  based on the one or more neighbor properties of the neighbor visual source element, determining that the reclassification rule is satisfied thereby reclassifying the particular visual source element from the different HLSD label to the particular HLSD label.

15. The system of claim 11, wherein the set of instructions includes instructions, which, when executed by the hardware processor, cause the hardware processor to further perform:
  identifying a child visual source element of the particular visual source element;
  based on priority configuration data, comparing one or more properties of the particular HLSD widget with one or more properties of a child widget of the child visual source element;
  based on comparing the one or more properties of the particular HLSD widget with the one or more properties of the child widget of the child visual source element, determining that the particular HLSD widget is a representative widget;
  excluding the child widget from the template.

16. The system of claim 11, wherein the set of instructions includes instructions, which, when executed by the hardware processor, cause the hardware processor to further perform:
  generating the layout arrangement of widgets for the template that includes the particular HLSD widget and a neighbor widget of the particular HLSD widget by:

arranging, within the layout arrangement, the particular HLSD widget with the neighbor widget based on a geometrical relationship between the particular HLSD widget and the neighbor widget, and adjusting the layout arrangement based on a geometry of visual source elements located higher in the tree hierarchy with respect to the particular visual source element corresponding to the particular HLSD widget.

17. The system of claim 11, wherein the set of instructions includes instructions, which, when executed by the hardware processor, cause the hardware processor to further perform:

generating the layout arrangement of widgets for the template that includes the particular HLSD widget arranged with another widget on adjacent rows or adjacent columns;

determining whether to merge the adjacent columns or the adjacent rows by applying a classifier algorithm to geometry-based, hierarchical, or background properties of the particular HLSD widget and the other widget, or determining whether to split one column/row into the adjacent columns or the adjacent rows by applying a classifier algorithm to geometry-based, hierarchical, or background properties of the particular HLSD widget and the other widget.

18. The system of claim 11, wherein the set of instructions includes instructions, which, when executed by the hardware processor, cause the hardware processor to further perform:

based on configuration data, modifying a value of a particular property of the particular HLSD widget, wherein the particular property is one or more of: font type, font size, color, and style.

19. The system of claim 11, wherein the textual format is based on HTML, markdown, vector graphics, JSON, or XML.

* * * * *